United States Patent [19]

Meier

[11] 3,933,962

[45] Jan. 20, 1976

[54] MANUFACTURE OF CONSTRUCTIONAL COMPONENTS

[75] Inventor: Peter Meier, Cham, Switzerland

[73] Assignee: Credelca A.G., Zug, Switzerland

[22] Filed: Sept. 11, 1972

[21] Appl. No.: 287,644

[30] Foreign Application Priority Data

Sept. 14, 1971 United Kingdom ............... 42701/71
Apr. 4, 1972 United Kingdom ............... 15301/72

[52] U.S. Cl. ................. 264/134; 264/228; 264/256
[51] Int. Cl.[2] ...................... B32B 31/121; B28B 3/10
[58] Field of Search ............ 264/228, 255, 256, 134

[56] References Cited

UNITED STATES PATENTS

| | | | |
|---|---|---|---|
| 2,663,908 | 12/1953 | Maier et al. | 264/268 |
| 2,960,063 | 11/1960 | Martuck | 264/134 |
| 3,689,625 | 9/1972 | Zipper | 264/268 |

FOREIGN PATENTS OR APPLICATIONS

| | | | |
|---|---|---|---|
| 998,120 | 7/1965 | United Kingdom | 264/134 |

*Primary Examiner*—Robert F. White
*Assistant Examiner*—James B. Lowe
*Attorney, Agent, or Firm*—Brumbaugh, Graves, Donohue & Raymond

[57] ABSTRACT

A structural component, such as a load-bearing column or a floor panel, is initially made undersize between two opposed faces and is brought to accurate size and the angularity of said faces made accurate, by locating the component relative to a reference surface, with a gap between that surface and one of the faces, that face is provided in the gap with a layer of settable material capable of adhering to the face, and this material is squeezed by relative adjustment between the reference surface and an abutment to give the component the desired accuracy. A load-bearing structure of room height, consisting of two such columns spaced apart with a cross-member between them, for rigid attachment to such a floor panel, is made by adjusting the two columns in such manner that they are parallel, the distance between them conforms substantially to an accurately predetermined value, bearing surfaces at their corresponding upper and lower ends are level with one another, and rigidly connecting each column to the cross-member by tolerance-accommadating joints spaced apart in the height of each column.

2 Claims, 15 Drawing Figures

MANUFACTURE OF CONSTRUCTIONAL COMPONENTS

SUMMARY OF THE INVENTION

This invention relates to the manufacture of transportable prefabricated room elements, and components thereof, and has for an object to provide a method of manufacturing such components with close linear and angular tolerances in at least one direction.

In this Specification 'transportable prefabricated room element' means a prefabricated structure, consisting of part of a storey of a building, which is transportable and capable of being built and substantially finished in a factory and comprises a prefabricated floor panel and the whole of the vertical load-bearing structures (e.g. end structures and/or intermediate structures) associated with it in the completed room element, which prefabricated structure is capable of withstanding all forces imposed on it during transport, and during and after erection into the building, and is adapted to be mounted face-to-face with a further room element in building up a storey or part of a storey of a building. The expression 'face-to-face' includes side-by-side, end-to-end and end-to-side. The expression 'vertical load bearing structure' includes a vertical load-bearing wall, a vertical load-bearing pillar or column, and spaced load-bearing pillars or columns. These columns may support 'fill-in panelling' to close or partly close a face of the structure and the expression 'fill-in panelling' includes a wall panel, a door or a window, and in the case of a wall panel the latter may be integral with two columns between which it extends or may be attached to them.

The columns are preferably prefabricated (e.g. of reinforced concrete) and are disposed at the perimeter of the floor panel, some or all of them being permanently and rigidly fixed thereto (as for example in British Patents Nos. 1101579 and 1109873). For example there may be a column at each corner, or at a plurality of the corners, of the floor panel.

Such room elements are intended to be fabricated in a substantially complete manner at a factory remote from the building site. In particular such electrical wiring, plumbing and heating installations, doors, partitions, glazing and interior finish, as are required in the completed building are applied to the room elements at the factory so as to bring them to a substantially finished condition. The room elements are then transported to the building site and there assembled into a building to which only the minimum finishing work such for example as concealing joint lines, and the assembly and connection of the services, needs to be carried out.

This system of building construction has recognised advantages but it also has its limitations. It will be appreciated that the size of the room elements is governed by transport considerations, and thus the maximum floor area of an individual room element is limited. Moreover, the mere bulk of the room elements renders special mechanical handling equipment necessary.

The floor panels should be made of reinforced concrete and hence their size and weight brings problems in their casting and handling. Also, the system does not readily permit room elements of various sizes to be constructed, for that would entail the use of a number of expensive moulds for the floor panels.

Moreover, the use of a single prefabricated floor panel imposes a limitation on the size in which the room elements can be economically constructed.

Finally, it will be appreciated that the room elements have to be prefabricated and finished whilst they are travelling along a production line. Their mere bulk renders transport along a production line difficult and the operations which have to be carried out in that production line render progress along it very slow. A further drawback is the limited access of workmen which renders it difficult for two teams to work simultaneously.

A high degree of linear and angular accuracy is required in the room elements, for a plurality of room elements are mounted face-to-face, tolerance errors are cumulative:— yet each room element ought to have its vertical and horizontal surfaces substantially flush with those of the next room element.

An object of the present invention is to make it possible to avoid some or all of the above-mentioned drawbacks.

A further object of the present invention is to provide a method of imparting, to a constructional component of a room element, a high degree of accuracy. Another object is the manufacture of a floor panel of increased length but having a high degree of dimensional accuracy.

British Patent No. 1350599 describes a transportable prefabricated room element in which the floor panel comprises a plurality of prefabricated floor panel components or sections rigidly connected together edge-to-edge by structural means and forming the bases of the corresponding regions of the completed room element, and at least one of these floor panel components forms the base of a transportable unit built into the room element, which unit comprises any upstanding load-bearing structure and/or upstanding non-load-bearing structure provided in the corresponding region of the completed room elements and is prefabricated in unit form prior to incorporation in the room element. Such a unit may also incorporate any installations required, at that region, in the completed room element. It will be appreciated that the angular and linear dimensional accuracy of the panel components is important, since errors are cumulative and result in variation in the floor panels. A high degree of accuracy in the end wall structures attached to the floor panel is also necessary. The present invention enables each component to be manufactured to close tolerances and it will be appreciated that any structural component such as a beam, column or panel may be accurately manufactured according to the method of the invention.

The present invention provides a method of imparting to a constructional component for a room element as hereinbefore defined, dimensional accuracy between opposed faces of the component, the component having been initially manufactured undersize as regards said dimension, which method comprises locating the component relative to at least one reference surface with a space between one of said faces and the reference surface, and providing a layer of settable material in said space so as to close the gap between said face and the reference surface, the settable material being capable of adhering to the component on setting so that said component, together with its added set material, possesses said accurate dimension, said dimension being determined by the distance between said face of the component and the reference surface.

The invention also provides a method of imparting, to a constructional component for a room element as hereinbefore defined, dimensional accurary between opposed faces of the component, the component having been initially manufactured undersize as regards said dimension, which method comprises, (a) applying to at least a part of at least one of the said faces, a layer of settable material capable of adhering to that face, (b) disposing the component with the applied settable material between opposed abutments, at least one of which constitutes a reference surface, with the settable material between said one face and the reference surface, (c) effecting relative approach between the abutments so as to squeeze and reduce in thickness the layer of settable material, (d) terminating said approach at a position giving the desired dimensional accuracy, and (e) allowing or causing the material to set before removal of the component.

The required dimensional accuracy may be a linear accuracy between opposed faces of the component. Alternatively or in addition, the required accuracy may be an angular accuracy (e.g. parallelism) between said opposed faces and/or between at least one of them and another surface or face of the component (e.g. a right angle).

One of the opposed faces of the component may be positioned against an abutment so as to locate the opposite face of the component relative to the reference surface.

There may be employed two reference surfaces between which the component is disposed with a space between each reference surface and an adjacent face of the component, the reference surfaces being relatively movable towards and away from one another, the settable material being disposed between each reference surface and the adjacent face of the component, and said relative movement being terminated at a stage producing the required accuracy.

In one embodiment of this method, a third face of the component, transverse to the said opposed faces, is located in a plane having a predetermined angular relation to the first said reference surface. This third face may be located in spaced relation to a third reference surface, and the settable material occupies the gap between said third face and third reference surface, the width of the gap being determined by the location of the said third face.

Alternatively or in addition, a fourth face of the component, opposite said third face, is disposed in spaced relation to a fourth reference surface, and the settable material occupies the gap between said fourth face and the fourth reference surface, the width of the gap being determined by the location of said fourth face.

In one embodiment, a still further face of the component, transverse to all said faces, is disposed in spaced relation to a still further reference surface, and the settable material occupies the gap between said further face and further reference surface.

It will be appreciated that the invention is applicable to producing a plurality of accurate dimensions in a single component of a room element, such as length, breadth, depth or thickness, and the angular relation of faces. The invention is especially applicable to columns, load-bearing structures, and panels (e.g. floor panels, or components for assembly to form a floor panel).

In the case of a column the method may be employed to adjust the length of the column and the angularity of at least one of its end faces.

In the case of a panel, the method may be employed to adjust the distance between, and the angularity of, opposed end faces of the panel. Furthermore, the method may be employed to adjust the thickness or depth, and/or width of the panel.

The settable material may be disposed on the appropriate face of the component before or after the component has been disposed in an initial space relationship to the appropriate reference surface, being subsequently squeezed between said face and surface.

The dimensions of the room elements may conform to Highway Codes in order that the room elements may be economically transported without special escort, the length not exceeding about 40 ft. and the width being about 8 to 10 ft; the height is not usually a critical factor in transportation but may be about 8 ft. or 10 ft. These dimensions may also conform to I.S.O. container standards, which are presently 8 feet × 8 feet × 40 feet (2.435 m.×2.435 m.×12.180m.).

It is known to prefabricate the aforesaid load-bearing structure as a monolithic cast concrete structure comprising two spaced reinforced concrete uprights integrally connected by a concrete cross member or members (i.e. at the base or the top, or both the base and the top of the uprights) the load-bearing structure being rigidly secured to the floor panel with two columns at the corners of an end of the panel.

Casting the load-bearing structure as a monolith presents certain difficulties or disadvantages. Among these may be ennumerated the size and shape of the mould, the difficulty to make this mould rigid and making it accurate, its expense, the fact that it occupies a relatively large amount of floor space, the reinforcing armature is difficult to prefabricate, the pouring of the concrete is difficult to industrialise and is slow, and the monolithic structure is difficult to extract from the mould. This monolithic structure is heavy and fragile, difficult to handle, transport, store and use; it is flexible so that it must be supported carefully during the curing stage to prevent permanent warping; it requires a large amount of storage space and must exist in its full size from the beginning of its manufacture. It is difficult to maintain the requisite dimensional tolerances of the overall height, relative height between the two columns, rectangularity and parallelism and it is also difficult to avoid warping. Only one size and shape of structure can be made with each mould. There is limited opportunity for pre-finishing it (i.e. applying installations, cladding, etc.), and the structure requires a long curing time.

It is convenient now to refer to FIG. 11 of the accompanying drawings, which illustrates in front and side elevation a monolithic load-bearing structure 200 (e.g. an end structure), and the linear and angular dimensions in which inaccuracies occur. This structure 200 comprises two vertical load-bearing columns or pillars 200*a* and 200*b* connected at the top by an integral cross member or lintel 200*c* and having fill-in panelling 200*d* extending between them near their bases.

The important dimensions are:

1. The vertical height between the bearing surfaces at the top and bottom of each of the columns, which should be equal for the two columns with these bearing surfaces on the same level and constant for each structure produced.

2. The angle between datum line DL and the level of the upper and lower bearing surfaces (said angle being 90°).
3. The width between the outer faces of the two columns.
4. The parallelism between the outer faces of the two columns.
5. The parallelism of the load-bearing surfaces to one another.

To these may be added:

6. Whether all four corners lie in a plane.

The order of importance in one or two storey buildings is 1, 2, 4, 3, 5 and 6, but in the case of higher buildings 1, 2 and 5 assume greater importance.

Discrepancies in these dimensions are cumulative in the completed building and can produce divergencies in the vertical stacking of the room elements on one another, and render it difficult or impossible to ensure that each floor panel is level and that all the floor panels of a storey are at the same height. Divergencies in the vertical stacking lead to ill-distributed vertical loading on the columns, with overloading of some columns, and eccentric loading on the columns with a consequent danger of buckling or structural failure. The discrepancies can further lead to a reduction in the resistance of the building to lateral loads, and to undesirable bending stresses being set up at the joints between the columns and floor panels.

An object of this invention is to avoid or minimise at least some of the disadvantages or draw-backs hereinbefore discussed, primarily in relation to multi-storey buildings, (e.g. three or more storeys), by providing a method of manufacturing the aforesaid vertical load-bearing structure to a higher degree of accuracy than heretofore achieved, while at the same time rationalising their production.

The invention therefore provides a method of prefabricating a vertical load-bearing structure for the frame of a transportable prefabricated room element as hereinbefore defined, which comprises taking initially separate subcomponents viz. two prefabricated reinforced concrete columns and at least one prefabricated cross member, the height of the two columns being predetermined and equal, disposing the cross member (or members) between the two columns and rigidly connecting the columns to the cross member (or members) in such manner that (a) the columns are parallel, (b) the distance between them conform substantially to a predetermined value, (c) bearing surfaces at their lower ends are level with one another, and (d) bearing surfaces at their upper end are level with one another, the connection being effected at two regions spaced apart in the height of each column by joints which accommodate manufacturing tolerances in the two components.

The invention also includes a method of prefabricating a vertical load-bearing structure for the frame of a transportable prefabricated room element as hereinbefore defined, which comprises assembling said structure from initially separate sub-components viz. two prefabricated reinforced concrete columns and at least one prefabricated cross member, the height of the columns being predetermined and equal, disposing the cross member (or members) between the two columns, adjusting the columns in such a manner that (a) they are mutually parallel, (b) the distance between them conforms substantially to a predetermined value, (c) bearing surfaces at their lower ends are level with one another and occupy a common plane, and (d) bearing surfaces at their upper ends are level with one another and occupy another common plane, and rigidly connecting the two columns to the cross member (or members) in their adjusted relation by tolerance-accommodating joints in each column which are spaced apart in the height of the column.

The foregoing method avoids difficulties and disadvantages inherent in, and consequent upon, casting the load-bearing end structure as a monolith. The columns are precast as essentially one-dimensional components. This simplifies numerous factors in their production such as the reinforcement, pouring, moulding, extracting, curing and the dimensional control. The moulds by which the components are produced are simple and robust and require little floor space.

The built-up structure has a linear and angular accuracy which cannot be achieved in a monolithic structure; uniformity in linear and angular dimensions, as between a number of the structures is also achieved.

The method is flexible in that the cross section and/or height of the columns can readily be varied: so can the shape of the structure in that it is possible to make it open for substantially its whole height (for example to provide an opening or to accommodate a door), or for part of its height (for example to accommodate a window) or so as to be fully closed by fill-in panelling. If the cross member is a lintel, its position may be variable; if it is a panel the type and thickness of the panel may readily be changed. The panel can be substantially completely finished before assembly into the structure; that is to say, any required installations, exterior or interior finish, or paintwork may be applied.

The columns may be manufactured to a predetermined height by any suitable manufacturing step and specifically by the method first described herein. The floor panel may also be manufactured by that method.

A gap may be initially left between the inner face of a column and an end face of the cross member, said gap being initially occupied by settable material or caulking material and the relative position of the column and cross member is adjusted to squeeze the settable material and reduce the gap. Preferably a gap is left between each end face of the cross member and the adjacent side face of the adjacent column, each gap being occupied by said material.

The invention is particularly described hereafter with reference to the accompanying drawings, wherein.

Figure 1:
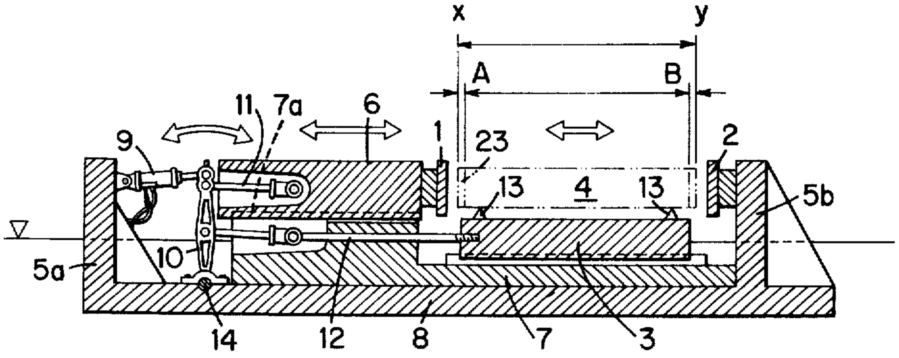
FIG. 1 is a longitudinal sectional view through apparatus for carrying out the method of the invention, showing a panel component in position before jaws of the apparatus are closed in operation.
Figure 2:
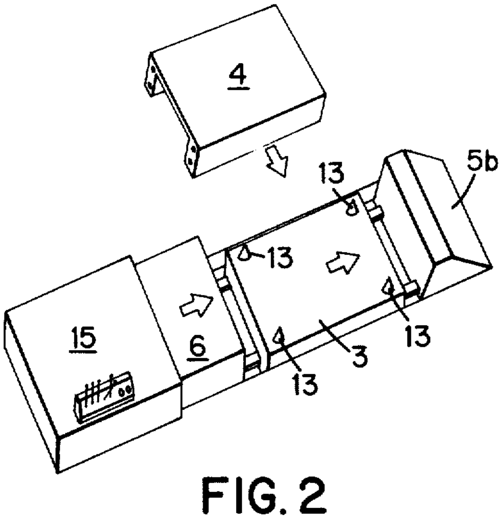
FIG. 2 is a perspective view of the apparatus, with the component removed.

Referring to FIGS. 1 and 2, the apparatus shown comprises a base 8 provided with first and second spaced uprights 5*a* and 5*b* and a bed 7 between the uprights. The bed has a raised upper surface 7*a* and a lower surface 7*b*. Reference surfaces to define a required accurate dimension between the surfaces of the component are provided in the form of a pair of jaws. A first jaw 1 is carried by a slide 6 mounted on the upper surface 7*a* and a second jaw 2 is mounted on upright 5*b*, the slide serving to move the first jaw towards and away from the second jaw. A platen 3 is slidably mounted on the lower surface 7*b* of the bed 7 and has on its upper surface a set (e.g. two pairs) of supports 13. A panel workpiece 4 may be seated, as shown, on the supports, so that its end faces are positioned directly between the jaws 1, 2. These supports are shown as cones, but they may be pads which are preferably mounted on ball-and-socket joints. Their function is to locate the under surface of the component 4 in a plane having a predetermined angular relation (at a right angle) to the reference surface.

A hydraulic piston and cylinder unit 9 is mounted on the first upright 5*a*, the piston being pivotally connected to a one-armed lever 10, the lever being fulcrummed at 14 on the base 8. A first connecting rod 11 connects the slide 6 to the lever and a second connecting rod 12 connects the platen 3 to the lever. The arrangement is such that the horizontal movement imparted to the slide 6 by the lever is twice that imparted to the platen 3.

A cover 15 (FIG. 2) is provided over the piston and cylinder unit and the lever and partially overlying the slide 6. A stop (not shown) is provided to limit movement of the second jaw towards the first jaw and the stop may be adjustable.

To manufacture a panel component to a desired accurate longitudinal dimension, the component is first manufactured basically so as to be smaller than said dimension, i.e. between the limits A–B, as shown in FIG. 1. The component will typically be made of concrete, which may be reinforced. A layer of settable, for example curable, filling material 23 is provided on both end faces of the basic component, so as to extend the length of the component beyond the desired accurate dimension, i.e. beyond the limits X–Y. The component is then positioned in the apparatus, as shown in FIG. 1 and the piston and cylinder unit 9 is operated to move the first jaw 1 towards the second jaw 2 and to move the platen 3 in the same direction. Movement of the platen serves to centralise the component between the jaws as the additional movement of the first jaw 1 causes the curable material to be compressed towards the basic component. The movement of the first jaw is limited by the stop, at which limit position the spacing of the jaws is equal to the desired accurate dimension. Any extruded excess curable material is removed and the remaining material is allowed to cure. Curing may be accelerated for example by application of heat, conveniently through the jaws, or high frequency generators may be provided in the jaws for this purpose. After curing, the component is removed from the apparatus. It is within the scope of the invention to further enhance the accuracy of the component by machining (e.g. grinding) the face of the set material. To prevent sticking of the cured material to the jaws, the latter may be coated with polytetrefluoroethylene, or an expendible film, such as paper, may be interposed between the material and each jaw.

Any shrinkage or creep (i.e. contraction over a long period) of the curable material would be so small due to the thinness of the added layer as to be negligible. It is envisaged that a basic panel component may be 4 mm to 8 mm undersized in respect of the desired accurate dimension, whereas the completed panel component may be several metres long. Tolerances of 0.05 mm/m may be met by the above method. The basic component must, of course, not be liable to shrinkage and, for example, must be fully cured, if composed of concrete, before the above method is carried out.

To meet desirable characteristics of strength, durability and fast curing, it is envisaged that epoxy resins may be used as the curable material, although refractory mortar and alumina cements may alternatively be used, as may quick-setting Portland cement such as TRICOVIT.

The curable material may be painted, sprayed or trowelled on the ends of the basic component, or the material may be a polymerisable sheet solid or may be contained in a heat disentegratable bag. It is also envisaged that, to support the curable material (which may be in a thixotropic form) during setting, metal foil may be provided on each basic component and held in place by dimples registering with or engaging in corresponding recesses in the basic component.

Figure 3:
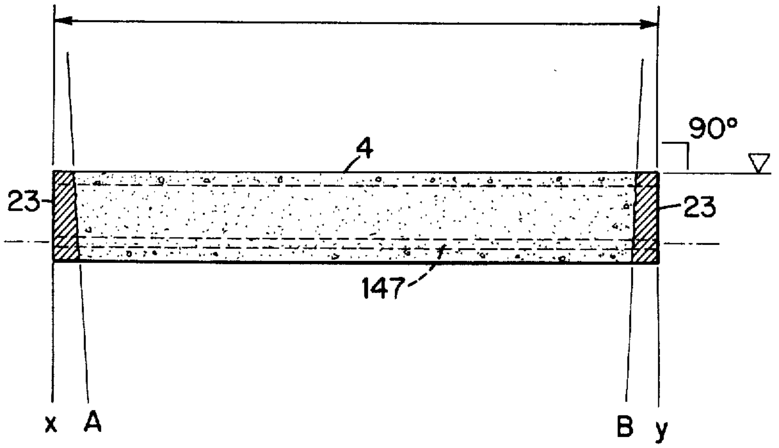
FIG. 3 is an enlarged elevation (partly in section) of the panel component after treatment in the apparatus according to the present invention.

In the above description, linear accuracy has been considered, but the angular relationship between the two end faces of the panel component is also important i.e. the two end faces of the panel component should be parallel to each other and perpendicular to a major surface (e.g. the upper and/or the lower surface). By carrying out the above method, this desired angular accuracy is also achieved if the two jaws have parallel operative faces and the component is located in the apparatus at a right angle to said faces. FIG. 3 shows a panel component 4, wherein the added material 23 is shown both to correct the angular relationship between the end faces of the component and to lengthen the component to the desired accurate dimension.

Figure 4:
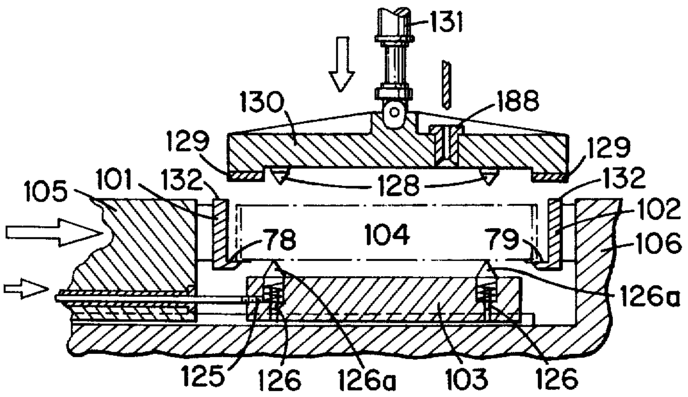
FIG. 4 is a longitudinal sectional view of an alternative form of apparatus for carrying out the invention, showing a panel component in position in the apparatus before operation of the apparatus.

Referring now to FIG. 4, the embodiment shown therein again comprises a bed 107 and a pair of spaced uprights, only one numbered 106 being shown in FIG. 4. A slide 105 and a first platen 103 are both slidably mounted on the bed. The slide 105 carries a first jaw 101 and the upright 106 carries a second jaw 102. Each first and second jaw has a flange defining a horizontal shoulder 78, 79 respectively. The slide 105 and the first platen 103 are both movable by a hydraulic piston and cylinder unit (not shown) in a two-to-one relationship as in the previous embodiment.

The first platen has in its upper surface a plurality of recesses each receiving a spigot 126 provided with a cone-shaped head 126*a* defining a support point. Each support point is biased upwardly by a helical spring 125 provided in the corresponding recesses and seating against the head 126*a*. A downwardly moving second platen 130 is provided having downwardly projecting cones 128 and abutment surfaces 129. A piston and cylinder unit 131 is provided to urge the second platen downwardly. The top surfaces 132 of the first and second jaws 101 and 102 serve as stops which co-operate with the abutment surfaces 129.

Figure 7:
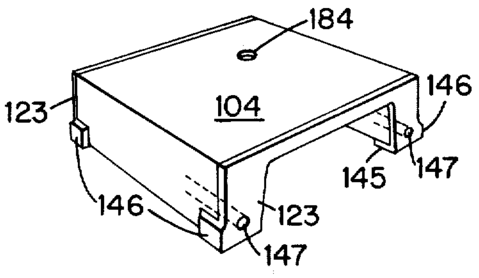
FIG. 7 is a perspective view of a panel component after treatment in the apparatus of FIG. 4 or FIG. 5 as modified according to FIG. 6.

This embodiment is used to control the linear dimensions of a panel component 104 in both horizontal and vertical directions, the angular dimensions being simultaneously controlled. The horizontal dimensions are controlled as described in relation to the first described embodiment. The vertical dimensions are controlled by lowering the second platen 130 until the abutment surfaces 129 rest on the stops 132. During such lowering the bottom of the basic component 104 presses down horizontally against the reference points 126*a* which provide an upward bias. The desired vertical dimension is determined by the vertical distance from the points of the cones 128 to the shoulders 78, 79 and the depth of the basic component is undersized with respect to this distance. Curable material is squeezed between the bottom of the basic component 104 and the shoulders 78, 79 and allowed to cure in situ. The component is then removed from the apparatus. In the horizontal direction the added cured material will not, of course, cover the entire bottom face of the basic component, but only two opposite marginal regions, or alternatively only each corner part of the bottom of the basic component. FIG. 7 shows a panel component when treated in apparatus as just described but a further treatment, which is described below, has been carried out on the component shown. The cured material added in the horizontal direction is shown by the numerals 123 and the material added in the vertical direction is shown by the numerals 145. Material 146 has also been added to control the width of the component, as described below.

Figure 5:
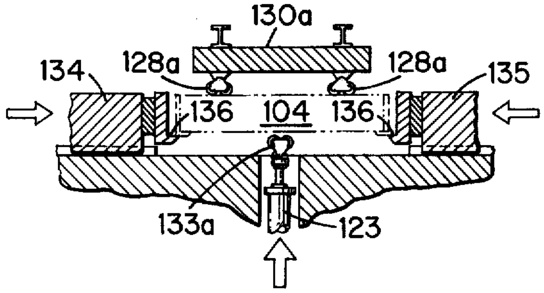
FIG. 5 is a diagrammatic elevation of a modification of the apparatus shown in FIG. 4.

A modification of the apparatus of FIG. 4 is diagrammatically illustrated in FIG. 5. In this modification, both jaws 134 and 135 are movable horizontally towards one another along guide or slideways. The downwardly movable upper platen 130 is replaced by a fixed platen 130A provided with downwardly projecting stops 128A. A piston and cylinder unit 123 is provided and serves to move upwardly a support 133A for the component 104, so as to urge the top surface of the component against the stops 128A. The curable material is inserted between the end faces of the component 104 and the faces of the jaws 134, 135 and between the shoulders 136 of the jaws 134, 135 and the margins of the bottom surface of the component 104. In this construction, each of the stops 128A and the support 133A is constituted by a pair of rollers mounted on a rockable carriage.

Figure 6:
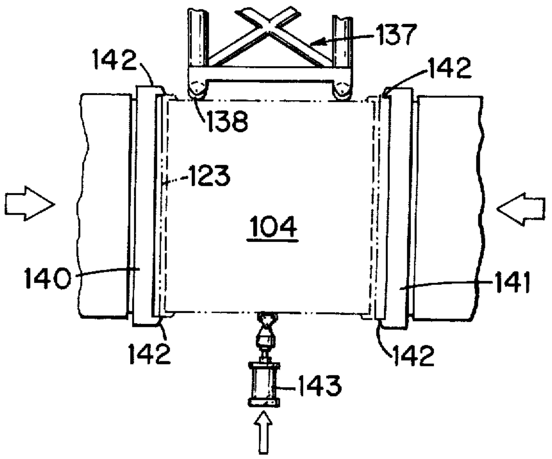
FIG. 6 is a diagrammatic plan view of a further modification, applicable to FIG. 4 or FIG. 5.

FIG. 6 shows an adaptation of the embodiment shown in FIGS. 4 or 5 for controlling the width of the component. This adaptation may be used additionally to the apparatus shown in FIGS. 4 or 5 or additionally to (a slightly modified version of) the apparatus of FIG. 1. In this adaptation, each jaw 140, 141 is provided with side flanges 142 and a side support 137 is provided having reference points 138. A piston and cylinder unit is provided to urge the component against the points 138. Curable material is inserted between the sides of the component and the flanges 142, so as to provide a finished component with side pieces 146, as shown in FIG. 7. In the component shown in FIG. 7, holes 147 are left for receiving prestressed members.

Figure 9:
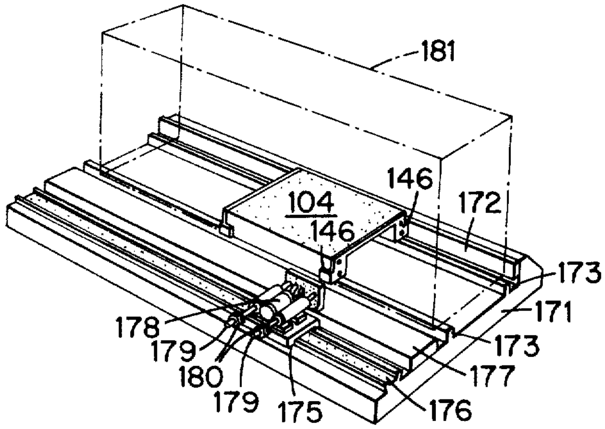
FIG. 9 is a perspective view showing apparatus for use in constructing a room element from components as shown in FIG. 7.

The panel component 104 shown in FIG. 7 is designed for building up room elements as described in British Patent No. 1,350,599. A series of such components may be aligned for connection with one another using apparatus as shown in FIG. 9. The components may be arranged with their faces 146 against a reference wall 172 of the apparatus and their bottom faces 145 seating on reference planes 173. These reference planes need not be full surfaces, but may be defined by relatively small pads, bosses or rails. Additionally, the apparatus may include a pressure shoe 174 mounted on a carriage 175 (slidable along a guide way 176) and urged against faces 146 of adjacent components 104 while being supported on surface 177 and operated by suitable means such as a hydraulic piston-and-cylinder device 178. The shoe 174 is further provided with guide rods 179 mounted by trunnions on carriage 175 and having adjustable stop nuts 180 to limit advance. The apparatus includes a plurality of these devices, which serve to position successive panel components against reference surface 172. While being lightly held against this surface, the components are post-tensioned together (ensuring lateral and vertical alignment) the post-tensioning cables extending through holes 147. Reference 181 indicates a room element, or a section thereof according to British Patent No. 1,350,599 incorporating a series of end-to-end panel components. The vertical load-bearing structure (FIG. 12) may stand on surfaces 173 which may be stepped down slightly to fix its height during attachment to the floor panel components.

Alternatively, each of the devices may include a plurality of bell-crabk levers mounted on a base 171 of the apparatus with their fulcra arranged parallel to the reference surface 172. A hydraulic piston and cylinder unit 178 is connected to each bell-crank lever and is operable to move the corresponding lever so as to urge the faces 146 of the component against the reference surface.

Before the panel components 104 are interconnected, one or more of them may be provided with further components such as a vertical wall, column or house fittings, as described in the said co-pending application. The further components may be located relative to the panel components using apparatus wherein the panel component is urged against a reference surface, the apparatus including stop or guide means for precisely locating the further component on top of the panel component or the panel component within the apparatus.

Figure 8:
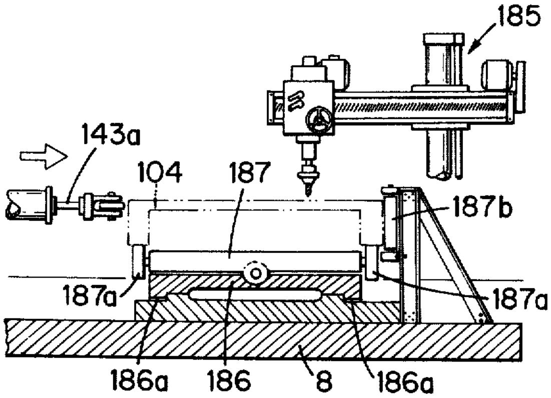
FIG. 8 shows apparatus for producing a hole through the panel workpiece or component.

FIG. 8 illustrates one form of apparatus (shown by way of example as a drilling machine 185) for piercing a hole 184 in a component 104, for mounting pipes or other fittings. The base 8 has a platen or carriage 186 slideable along guides 186*a* and carrying a rocking cradle 187. The cradle has support rollers 187*a* for the component 104, and a side face of the latter is urged against vertical locating rollers 187*b* by a pressure device 143*a* incorporating a pressure roller. Thus the component 104 is adjustable endwise and is accurately located. A bush 188 for guiding a drill is shown in FIG. 4.

Referring to FIG. 9, that apparatus is primarily applicable to workpieces having accurate locating surfaces, so that simple locating devices will suffice.

Figure 10:
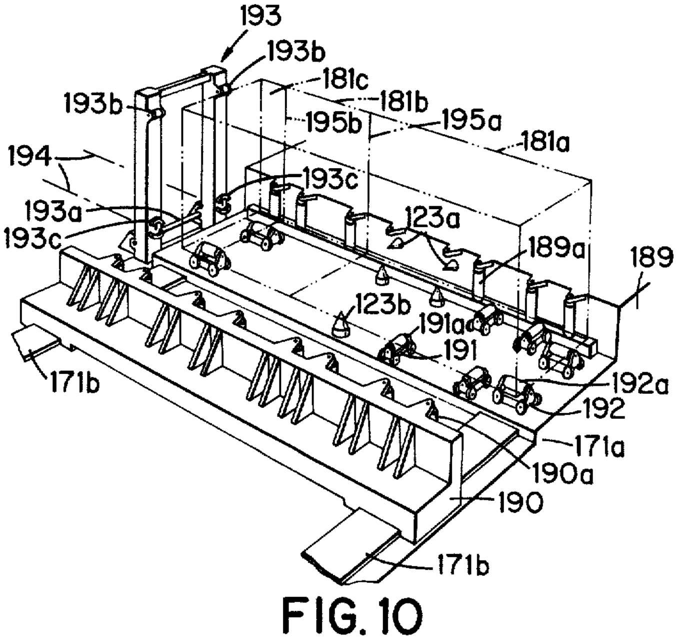
FIG. 10 is a perspective diagrammatic view showing apparatus corresponding to that shown in FIG. 9 for constructing a room element from components treated in apparatus according to the FIG. 1 embodiment.
Figure 11:
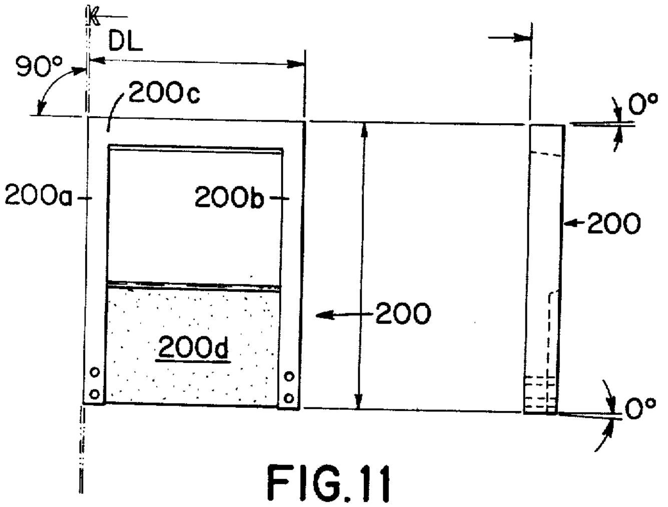
FIG. 11 shows a monolithic load-bearing structure (of room height) in front and side elevation.
Figure 12:
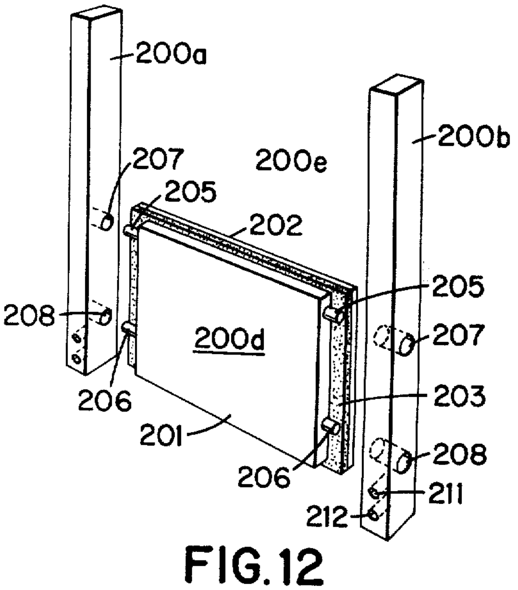
FIG. 12 is a perspective side view illustrating the assembly of sub-components for a loadbearing structure (of room height) according to this invention.
Figure 13:
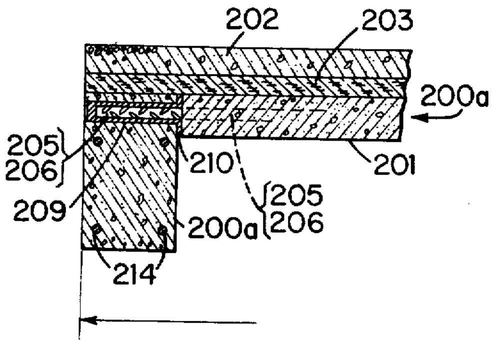
FIG. 13 is a cross-sectional plan through one of the columns and the adjacent part of a cross member of FIG. 12.

FIG. 10 illustrates apparatus for locating successive workpieces lacking accurate reference surfaces on the sides and bottom, so that these workpieces (i.e. floor panel components) can be located and fixed end-to-end and to a load-bearing end structure (such as is shown in FIG. 12).

The base 171*a* has a fixed jaw 189 carrying vertical locating rollers 189*a* and/or locating points diagrammatically respresented by cones 123*a*, and an opposed movable jaw 190 carrying vertical locating rollers 190*a*. Jaw 190 is slidable along suitable guides 171*b* by suitable pressure means (not shown) so as to press the components 104 against the locating means 189*a* or 123*a*. In this movement, the under surface of the components is positioned on rollers 191*a* on wheeled trolleys 191 movable widthwise of the base (or on suitable reference points 123*b*) and on rollers 192*a* on identical wheeled trolleys 192 movable lengthwise of the base, horizontal support surfaces being provided for these trolleys to rest and move on.

At an end of the base there is an upstanding stop frame 193 having a limited degree of rocking movement about a horizontal fulcrum 193*a*. Frame 193 also carries locating means (shown as rollers 193*b*) for engaging a load-bearing end structure of a room element or a section of a room element, and locating pressure pads 193*c* for engaging faces of the columns of the end structure. These pads have holes through which the post-tensioning cables are threaded through the holes 211, 212 (FIG. 12) of the end structure and through the holes 147 of successive floor panel components mounted in the apparatus. The centre lines of these cables are indicated by lines 194. Alternatively, rigid tie rods may be inserted through the holes 147, 211 and 212.

Suitable support surfaces (e.g. trolleys) may be provided on the base 171*a* for positioning the end structure at the required height.

The apparatus of FIG. 10 is primarily applicable to the connection of unitary prefabricated (and pre-finished) sub-assemblies (or sections of a room element) according to British Patent No. 1350599, in direct contact, at least some of said units comprising a prefabricated floor panel section such as 4 or 104. Since the preferred embodiment employs post-tensioning for the connection, the settable material or filler applied to the panel sections should be capable of withstanding post-tensioning forces when set (about 15 tons on the total cross-sectional area). This material should be capable of withstanding at least a significant portion of the structural load:- that is, must constitute a member of a moment resistant connection between adjacent panel sections and between a panel section and a load-bearing structure. It will also have to transmit significant vertical shear forces, but because of the compressive forces due to the post-tensioning its coefficient of friction need not be high. The modulus of elasticity should be of the same order as that of the compound.

In FIG. 10, adjacent pre-finished units are indicated at 181*a*, 181*b*, and 181*c*, the joint faces between them being indicated at 195*a*, 195*b*. The units are not necessarily of the same length.

Referring now to FIGS. 12 – 15, the cross member 200*d* is shown in FIG. 12 as a prefabricated window-breast panel consisting of a rigid interior panel 201, an outer panel 202, and an intermediate layer 203 of rigid insulating material such as for example a foamed plastic or cork. The inner panel 201 is preferably of reinforced concrete while the outer layer or panel 202 may be made of weather resistant material, concrete being preferred. This member 200*d* can be prefinished before the assembly of the load-bearing structure. For example, the outer face of the panel 202 can be painted, glazed, tiled, or otherwise prefinished and if necessary can be covered with a protective layer. The inner surface of the structural panel 201 can be plastered, papered, tiled, veneered, or panelled or otherwise prefinished and protected. A window opening 200*e* is provided above panel 200*d* and may be finished and glazed before assembly of the structure in a room element or in a section of a room element.

At each of its end faces the inner structural panel 201 is provided with protruding metal dowels 205, 206 spaced apart vertically, and each of the columns 200*a*, 200*b* is provided with corresponding holes, 207, 208 constituted by cast-in metal bushes the diameter of the bores of which is greater than the diameter or the dowels 205, 206 so as to provide a clearance.

The dowels 205, 206 may form a part of or be attached to the reinforcement of the inner panel 201 when the latter is made of reinforced concrete, and the metal bushes are preferably welded or otherwise secured to the reinforcement of the columns 200*a* and 200*b*.

The columns 200*a*, 200*b* are offered to the ends of the panel 200*d* so that the dowels 205, 206 enter the clearance holes 207, 208, and are so adjusted as to give the required accuracy or values of the linear and angular dimensions of the load-bearing structure. This adjustment is possible because of the fact that the dowels 205, 206 are clearance fit in their holes 207, 208. The three sub-components are held in their desired attitudes, for example by means of a jig, and the dowels 205, 206 are permanently fixed in their clearance holes. A rigid union between the dowels and the metal bushes may be achieved by a setting adhesive, conveniently an epoxy resn such as that made and sold under the name "Aderit Special" by Firma Meynadier. To form a quick setting cement this resin is mixed with quartz sand as an aggregate substantially in the proportion of 1 to 1 by weight. Alternatively, the bond may be produced by thermit welding, the thermit metal bond being indicated at 209 in FIG. 13. 209 may also indicate a filling produced by molten lead.

In the adjusted position of the sub-components there will be a narrow gap 210 between one or each of the end faces of the inner panel 201 and the adjacent inner face of the associated column. This gap may be wholly or in part occupied by an adhesive filling such for example as a quick setting cement or the aforesaid setting adhesive, but is preferably sealed with a caulking material, such as butyl putty or neoprene rubber.

The joints thus formed between the columns and the cross member accommodate the manufacturing tolerances of the sub-components, and permit an accuracy in the finished load-bearing structure that is impossible in a monolithic cast structure.

The fact that each column is rigidly secured to the cross member at regions spaced apart in the height of the column ensures that the structure is very rigid and is resistant to side loads. It also reduces the danger of buckling by reducing the unbraced length of the column, thus permitting higher loads. However, instead of securing the two columns to a single cross member, they may be secured to two cross-members at regions spaced apart in their height, for example at the top and bottom, being secured to a lintel at the top and a spandrel beam at the bottom by one or more of the dowel and socket joints.

In rigidly joining the columns to the floor panel, there may be employed a joint which permits of initial adjustment between the column and the floor panel so that the columns have the required angular altitude and the completed structure has the required dimensional accuracy. For this purpose, each column is provided, near its base, with two vertically-spaced holes 211, 212 for use in rigidly joining the end structure to the end of a rigid floor panel by, for example, the method described in British Patent No. 1 101 597 or No. 1 109 873.

Such a joint is tolerance-insensitive or tolerance-accommodating.

It may here be mentioned that inclination of either or each of the columns, from the vertical, in the lengthwise direction of the floor panel is detrimental, especially in the case of multi-storey buildings. The avoidance of this inclination is one of the advantages of the aforesaid joint.

Particularly if a face at the base of a column makes direct contact with a face on the end of the floor panel the presence or absence of such inclination is a function of the angular attitude of said contact faces. Thus for example, if a vertical face in a column fits against an end face of the floor panel, the angular attitude of the column depends on the angle of said end face. If a horizontal bottom face of a column sits on the upper face of the floor panel, the angular attitude of the column depends on the angle of said bottom face.

The columns may be brought to their required height after casting but before or after assembly, and one or each end face adjusted by machining one or both end faces or by the method first described herein.

Each column of reinforced concrete is initially made slightly shorter than required and is disposed lengthwise between two jaws or reference faces with a gap between one or each face of the column and the adjacent jaw. The reinforcement of a column is indicated at 214 in FIG. 13. A settable material, capable of adhering to the concrete, is introduced into this gap (or is applied to the column before the latter is placed between the two jaws) and the jaws are caused to approach, by movement of one or each of them thereby squeezing the layer and reducing its thickness. This approach movement is terminated by at least one preset stop at a distance, between the jaws, which gives the required length to the composite column. By this procedure, not only is accuracy in length achieved, but the end faces of the finished column lie in parallel planes at right angles to the length of the column.

The height of the columns may be about 3.5 m and their cross sectional dimensions about 200 mm by 350 mm: the distance between their outer faces in the finished structure may be about 2.5 m.

Figure 14:
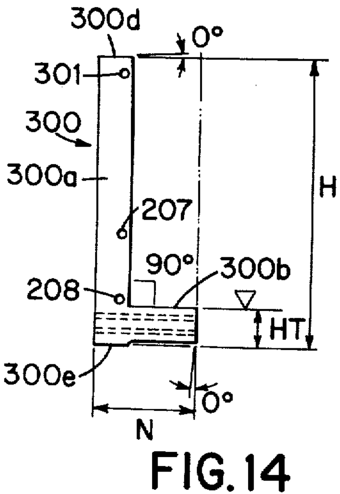
FIG. 14 is a side elevation and FIG. 15 is a perspective view of a modified load-bearing column.
Figure 15:
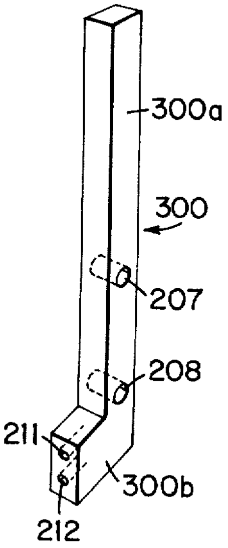

Referring now to FIGS. 14 and 15, the column 300 therein illustrated has a vertical part **300*a* and a horizontal foot 300*b*. The base length N, the angle of the end face 300*c* and the height H of the column, the foot height H.T., and the angles of its upper surface 300*d* and bottom surface 300*e*, are adjusted. Thereby the face 300*c* is brought to be parallel with the column part 300*a* and the faces 300*d*, 300*e* to be at a right angle thereto. The end face 300*c* is intended to be fixed against the end face of a floor panel or floor panel component made as hereinbefore described. This ensures that each column is of the correct neight and stands at a right angle to the floor panel, the two columns at an end of the floor panel are vertical and parallel to one another, the faces 300*d* and 300*e*** are horizontal, and that the length of the frame (comprising the floor panel and the added load-bearing structure) is accurate.

It will be understood that the face **300*e*** of each column rests on the upper end of the corresponding face of a column or a lower storey, or (in the case of a bottom storey) on a foundation, thus ensuring accuracy in the height and level of the floor panels and the vertical registration of superimposed columns.

A roof or ceiling may be mounted on or between the upper ends of spaced columns (e.g. columns at corners of the room element. FIG. 14 shows a hole 301 near the top of the column, for use in connecting the upper ends of two columns of an end structure to a cross member (e.g. by dowel-and-socket joints as in FIG. 12).

In all embodiments of the present invention, it may be desirable to allow for shrinkage of the settable material while it is permitted or caused to set.

It is pointed out that the present invention permits components, subject to initial manufacturing variation or tolerances, as regards their major surfaces, to be brought to a high degree of accuracy in respect of their linear dimensions between major surfaces and the angular relations of the major surfaces.

The term "major surface" when related to a column means the top or bottom surface thereon. When related to a panel it means (a) and end surface at which said panel is to make contact with another panel or with a load-bearing structure, (b) the top or bottom surface of the panel, and (c) a side face of the panel, which requires to be aligned with the like side face of an adjacent panel.

Room elements, and buildings incorporating them form the subject of British Patent No. 1,019,628, 1,027,241, 1,027,242, 1,034,101, 1,068,172, 1,101,385, 1,101,597, 1,250,883, and 1,271,024, to which reference may be made for further particulars of constructions to which the present invention is applicable.

The invention includes the apparatus for carrying out the foregoing methods.

What is claimed is:

1. A method of imparting, to a constructional component for a room element, dimensional accuracy between opposed faces of the component, the component having been initially manufactured undersize as regards said dimension, which method comprises, (a) applying to at least part of both of said opposed faces, a layer of settable material capable of adhering to said opposed faces, (b) disposing the component with the applied settable material between opposed abutments, two of said abutments constituting reference surfaces, with the settable material disposed between each reference surface and a different adjacent one of the opposed faces of the component, (c) effecting relative approach between the abutments so as to squeeze and reduce in thickness the layers of settable material, (d) terminating said approach at a position giving desired dimensional accuracy, and (e) allowing or causing the material to set before removal of the component from between the opposed abutments.

2. A method of imparting dimensional accuracy to a substantially rigid constructional component for a room element, which method comprises, (a) manufacturing the component undersize, at least as regards a dimension measured between opposed faces of the component, (b) applying to at least part of both of said opposed faces a layer of settable material capable of adhering to said opposed faces, (c) disposing the component with the applied settable material between opposed abutments, two of said abutments constituting reference surfaces, with the settable material disposed between each reference surface and an adjacent one of the opposed faces of the component, (d) effecting relative approach between the abutments so as to squeeze and reduce in thickness the layers of settable material, (e) terminating said approach at a position giving desired dimensional accuracy, and (f) allowing or causing the settable material to set and become rigid before removal of the component from between the opposed abutments.

* * * * *